United States Patent
Shrum, Jr. et al.

(10) Patent No.: US 8,135,394 B1
(45) Date of Patent: Mar. 13, 2012

(54) COMPUTATIONAL COMMUNICATIONS SERVICE MAINTENANCE METHODS AND SYSTEMS

(75) Inventors: Edgar Shrum, Jr., Smyrna, GA (US); Barrett Kreiner, Woodstock, GA (US); Steven Wright, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1106 days.

(21) Appl. No.: 11/969,062

(22) Filed: Jan. 3, 2008

(51) Int. Cl.
*H04M 11/00* (2006.01)

(52) U.S. Cl. ..... 455/421; 455/423; 455/519; 455/67.11; 455/445

(58) Field of Classification Search .......... 455/421–425, 455/445, 67.11–67.16, 517–519, 436
See application file for complete search history.

(56) References Cited

U.S. PATENT DOCUMENTS

| | | | | |
|---|---|---|---|---|
| 5,189,734 A * | 2/1993 | Bailey et al. | ............... | 455/438 |
| 5,212,808 A * | 5/1993 | Su et al. | .................. | 455/502 |
| 5,995,830 A * | 11/1999 | Amin et al. | .................. | 455/423 |
| 6,038,444 A * | 3/2000 | Schipper et al. | ............. | 455/421 |
| 6,246,872 B1 * | 6/2001 | Lee et al. | ................... | 455/414.1 |
| 6,343,216 B1 * | 1/2002 | Kim et al. | .................... | 455/450 |
| 6,591,115 B1 * | 7/2003 | Chow et al. | ................... | 455/555 |
| 6,665,521 B1 * | 12/2003 | Gorday et al. | ............ | 455/67.11 |
| 6,721,572 B1 * | 4/2004 | Smith et al. | ................ | 455/456.1 |
| 7,003,286 B2 * | 2/2006 | Brown et al. | ................ | 455/416 |
| 7,062,283 B2 * | 6/2006 | Dooley | ......................... | 455/504 |
| 7,065,364 B1 * | 6/2006 | Todd | .............................. | 455/445 |
| 7,072,641 B2 * | 7/2006 | Satapathy | .................. | 455/412.1 |
| 7,215,969 B2 * | 5/2007 | Benco et al. | ............... | 455/456.6 |
| 7,228,145 B2 * | 6/2007 | Burritt et al. | ................. | 455/519 |
| 7,920,885 B2 * | 4/2011 | Singh et al. | .................... | 455/517 |
| 7,941,108 B2 * | 5/2011 | Shaffer et al. | ............. | 455/115.3 |
| 2002/0037715 A1 * | 3/2002 | Mauney et al. | ............... | 455/421 |
| 2006/0205402 A1 * | 9/2006 | Banavar et al. | ............ | 455/426.1 |

OTHER PUBLICATIONS

Schenker, "Free Mobile Services Set to Take Off", retrieved on Sep. 26, 2007 at <<http://www.businessweek.com/globalbiz/content/sep2007/gb20070924_112397.htm>>, BusinessWeek, Mobile Advertising, Sep. 24, 2007, 2 pages.

* cited by examiner

*Primary Examiner* — Sharad Rampuria
(74) *Attorney, Agent, or Firm* — Hanley, Flight & Zimmerman, LLC (57) ABSTRACT

Methods and means provide for handling wireless signal sessions. A failure in wireless communication between a wireless device and a supporting wireless system is detected. The wireless signal session is preserved in a hold state for a limited time. The wireless system attempts to reestablish communication with the wireless device by way of one or more resources of the wireless system prior to the expiration of hold period. Reestablished communication can involve another communications tower or other aspects of the wireless system. In one or more embodiments, other wireless devices are accessed and serve to daisy chain wireless communications between the wireless device and wireless system until direct communications can be reestablished.

18 Claims, 5 Drawing Sheets

COMPUTATIONAL COMMUNICATIONS SERVICE MAINTENANCE METHODS AND SYSTEMS

BACKGROUND

Devices that use wireless signaling are ubiquitous to contemporary life. Non-limiting examples of such devices include cellular telephones, text messaging units, personal digital assistants (PDAs), and laptop and palmtop computers. Respective such devices typically include one or more modes of operation such as, for example, unidirectional or bidirectional voice, video and/or data communications, Internet accessibility, remote control functionality, etc.

However, such devices are dependant upon access to wireless resources (i.e., networks or infrastructure) external to the device in order for corresponding wireless functions to operate. For example, a cellular telephone requires a period of continuous signal access to a cellular network in order to initiate and maintain a call. However, worldwide coverage for all wireless devices, everywhere that a user might want or need signal access, is not a reality.

Various factors result in poor or failed wireless signal access in areas that are otherwise seemingly adequately provisioned. In one example, a user loses wireless signal access while traveling behind a large structure in a downtown area, resulting in a "dropped" cellular phone call. In another example, a user enters a tunnel and loses wireless signal access with an Internet service provider. These and other scenarios cause frustration and loss of productivity for users of wireless technology.

SUMMARY

This summary is provided to introduce general concepts of wireless signal session handling methods and systems, which are further described below in the Detailed Description. This summary is not intended to identify essential features of the claimed subject matter, nor is it intended to limit the scope of the claimed subject matter.

In one aspect, a method includes detecting a communication failure between a wireless device and a wireless system during a wireless signal session. The method also includes preserving the wireless signal session in a temporary hold state at the wireless system. The method further includes reestablishing communication between the wireless device and the wireless system so as to continue the wireless signal session.

In another aspect, at least one computer-readable storage media includes a program code. The program code is configured to cause one or more processors to detect a communication failure with a wireless device during a wireless signal session. The program code is also configured to cause the one or more processors to preserve the wireless signal session in a temporary hold state. The program code is further configured to cause the one or more processors to reestablish communication with the wireless device so as to continue the wireless signal session.

In yet another aspect, at least one computer-readable storage media includes a program code. The program code configured to cause one or more processors of a wireless system to detect a failure in communication between a wireless device and a telecommunications device during a wireless signal session. The wireless signal session is performed by way of the wireless system. The program code is also configured to cause the one or more processors to preserve the wireless signal session in a hold state of predefined limited duration. The program code is configured to cause the one or more processors to issue a notification to the telecommunications device corresponding to the hold state of the wireless session. The program code is further configured to cause the one or more processors to reestablish communication between the wireless device and the telecommunications device before the limited duration of the hold state has expired.

BRIEF DESCRIPTION OF THE DRAWINGS

The detailed description is set forth with reference to the accompanying figures. The use of the same reference numbers in different figures indicates similar or identical items.

DETAILED DESCRIPTION

Overview

This disclosure is directed to providing wireless signal session handling. The methods and means provided herein serve to detect a communication failure between a wireless system (typically, infrastructure) and a wireless device accessing that system. The wireless session that was in progress, prior to the communications failure, is preserved in a temporary "hold" state by the wireless system. One or more attempts are then made to reestablish communication with the wireless device before the expiration of a predefined hold period. Announcements can be made to other telecommunications devices providing information regarding the hold state and/or system attempts to reestablish wireless signal contact with the wireless device. In this way, wireless communications need not, in at least some cases, be reinitiated from the beginning. Thus, a previously interrupted wireless communication session can continue with reduced inconvenience to the user.

Illustrative Operating Scenarios

Figure 1:
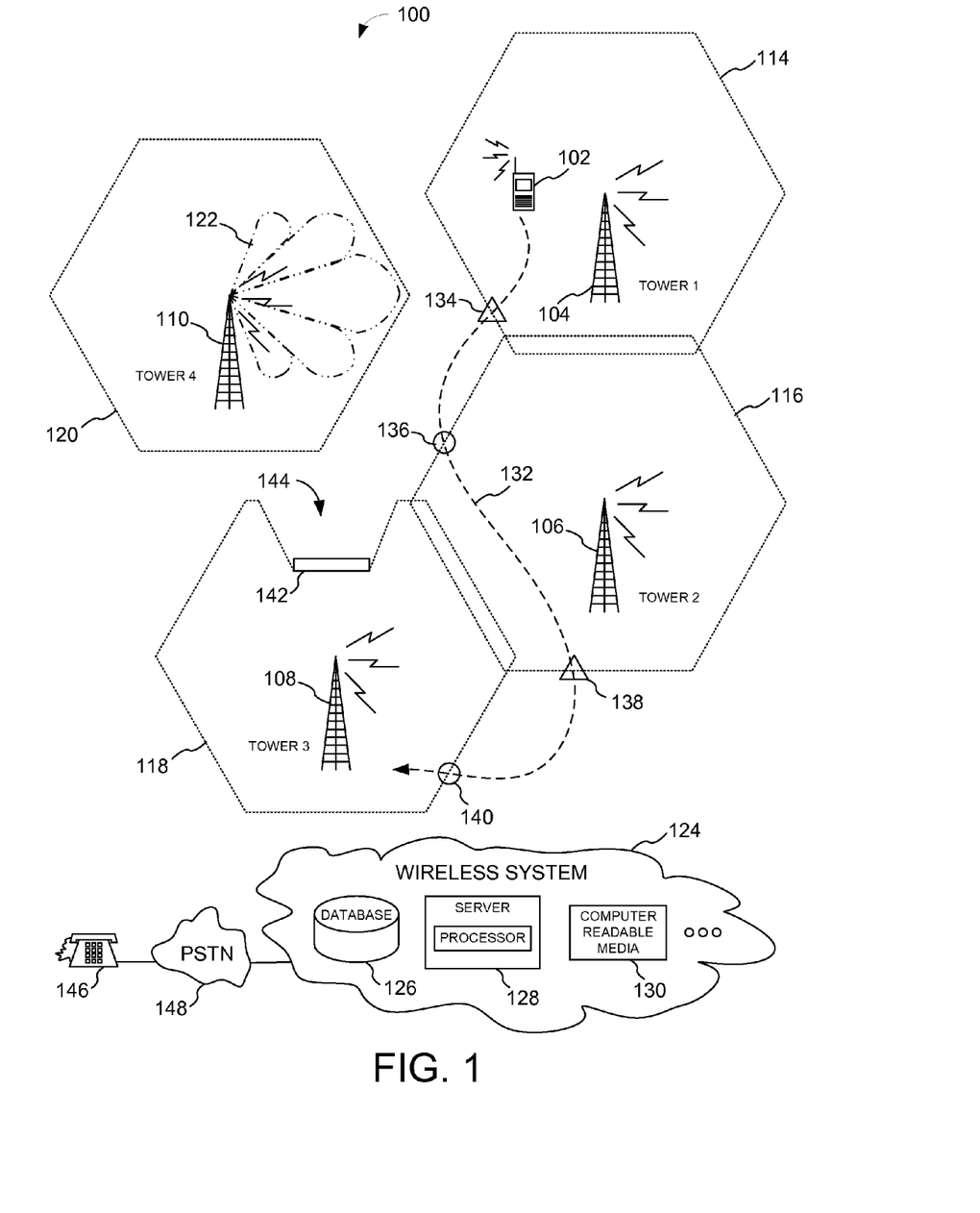
FIG. 1 is a diagrammatic view depicting an illustrative operating scenario.

FIG. 1 is a diagrammatic view depicting an illustrative operating scenario 100. In FIG. 1, a wireless device 102 is present and is presumed to be operated by a corresponding user (not shown). For purposes of ongoing example, it is assumed that the wireless device 102 is a cellular telephone. Other wireless devices 102 (e.g., laptop computers, PDAs, etc.) corresponding to other, similar operational scenarios are also contemplated within the scope of the present teachings. The wireless device 102 is portable in nature and is configured to operate in one or more modes as the user moves about within a wireless signal coverage area.

The scenario 100 also includes four cellular service towers 104, 106, 108 and 110, respectively. Each of the cellular towers 104, 106, 108, 110 includes an area of cellular (i.e., wireless) signal coverage 114, 116, 118 and 120, respectively. It is further noted that some of the coverage areas (e.g., 114 and 116; 116 and 118) exhibit some degree of overlap with each other. Further depicted is an obstruction 142 (e.g., a large building, a hill, etc.) within the area 118 of the cellular service tower 108. The obstruction 142 causes a lack of wireless signal coverage within a region 144. The region 144 can also be referred to as a "radio shadow". While the respective signal coverage areas 114, 116, 118, 120 are represented in FIG. 1 as substantially hexagonal in shape, one of ordinary skill in the related arts will appreciate that such representation is a simplification for ease of understanding. In any case, each cellular service tower 104, 106, 108, 110 can provide signal coverage to a finite region about the respective tower. According to exemplary embodiments, the cellular service tower 110 further includes a finite range of Wi-Fi® signal service as represented by coverage lobes 122. Wi-Fi® is a registered trademark owned by Wireless Ethernet Compatibility Alliance, Inc., Austin, Tex., USA.

The cellular towers 104, 106, 108, 110 are coupled to a wireless system (i.e., infrastructure) 124 (such coupling is not depicted in FIG. 1). The wireless system 124 includes a database 126, a server 128 and computer-readable storage media 130. Non-limiting examples of the computer-readable storage media 130 include one or more optical disks, one or more magnetic storage media, one or more solid state memory devices, etc. The wireless system 124 can include any other resources (not shown) as needed to support one or more wireless services (e.g., cellular telephone, Internet access, etc.) for wireless devices (e.g., 102). Non-limiting examples of such wireless system 124 resources include additional databases, additional servers and/or computer systems, wireless signal analysis instrumentation, network and/or Internet access bridges, public switched telephone network (PSTN) interface equipment, wireless signal receivers, transmitters and/or transceivers, etc. As depicted, a landline telephone 146 is coupled to the wireless system 124 by way of a PSTN 148.

In one illustrative operation, a user of the wireless device 102 traverses a path 132. In doing so, the user leaves the signal coverage area 114 at point 134 (represented by a triangle) and eventually enters the signal coverage area 116 at point 136 (represented by a circle). The user continues to move along the path 132 and leaves the signal coverage area 116 at a point 138 and later enters the signal coverage area 118 at a point 140. Thus, the user experiences a loss of wireless signal (e.g., cellular) access between the points 134, 136 and between the points 138, 140. One or more wireless operations are not possible along the path 132 between the points 134, 136 and the points 138, 140, giving rise to two "blackout periods" in the context of this illustration. Such blackout periods are a primary cause of frustration and inefficiency for users of wireless devices. In addition, wireless signal (cellular) access would not be possible within the radio shadow 144 caused by the obstruction 142.

Figure 2:
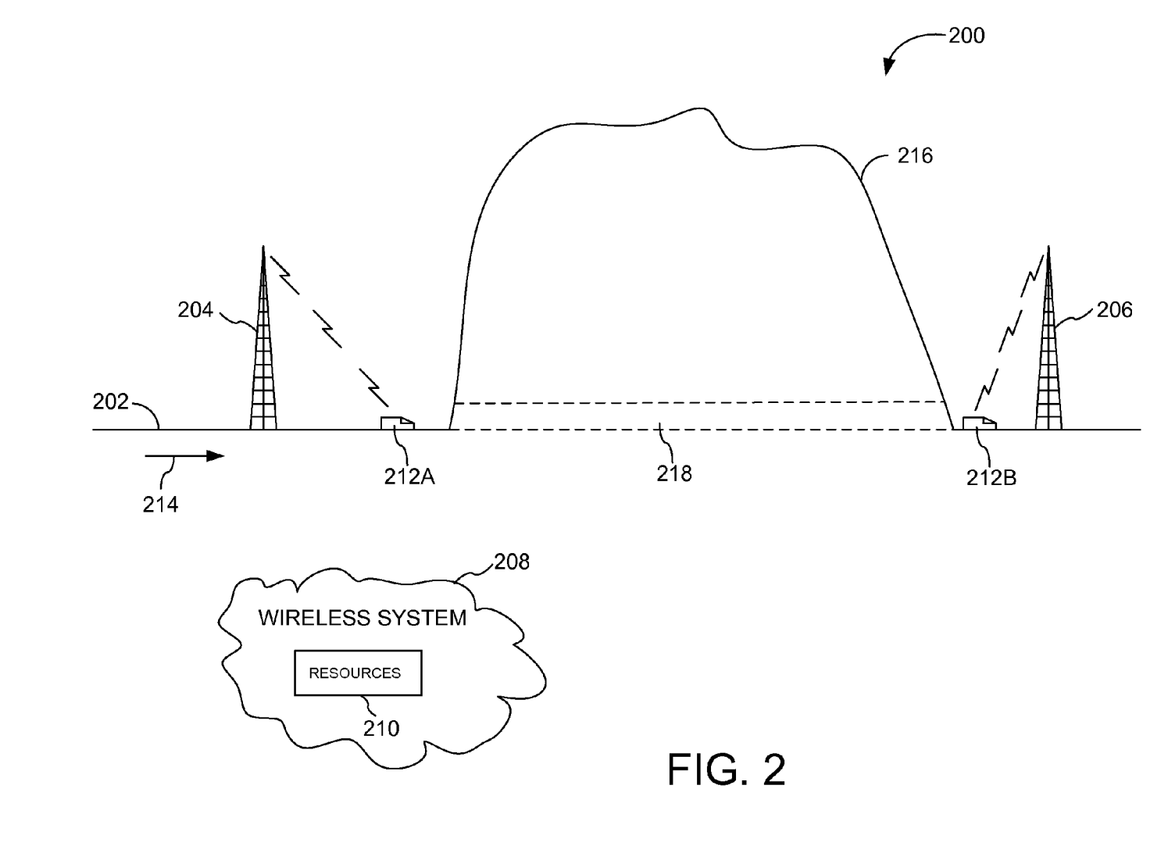
FIG. 2 is an elevation diagrammatic view depicting another illustrative operating scenario.

FIG. 2 is an elevation diagrammatic view depicting another illustrative operating scenario 200. A highway 202 carries automobile traffic. First and second cellular service towers 204 and 206, respectively, are located within wireless service range of the highway 202. The cellular service towers 204 and 206 are coupled to a wireless system 208. The wireless system 208 includes resources 210 that can include, for example, any of the respective resources 126, 128, 130 and/or otherwise as described above in regard to the wireless system 124 of FIG. 1. Automobiles 212A and 212B traverse the highway 202 in a direction 214. Respective wireless devices (not shown) within the automobiles 212A and 212B access wireless service(s) of the wireless system 208 by way of the cellular service towers 204 and 206.

As also depicted, the highway 202 extends through a mountain 216 by way of a tunnel 218. Wireless signal (e.g., cellular) service is not available within the tunnel 218, thus resulting in a communication failure (e.g., dropped call, etc.) for any wireless device that is operating upon entry to the tunnel 218. Under known technology, a user experiencing such a dropped cellular call (or another type of wireless service loss) must wait until exiting the tunnel 218 and reestablish new wireless signal access by way of the cellular service tower 206. Thus, the tunnel 218 represents a common type of radio shadow or "dead zone" that frustrates users of wireless signal services.

Illustrative Wireless Session Handling

Figure 3:
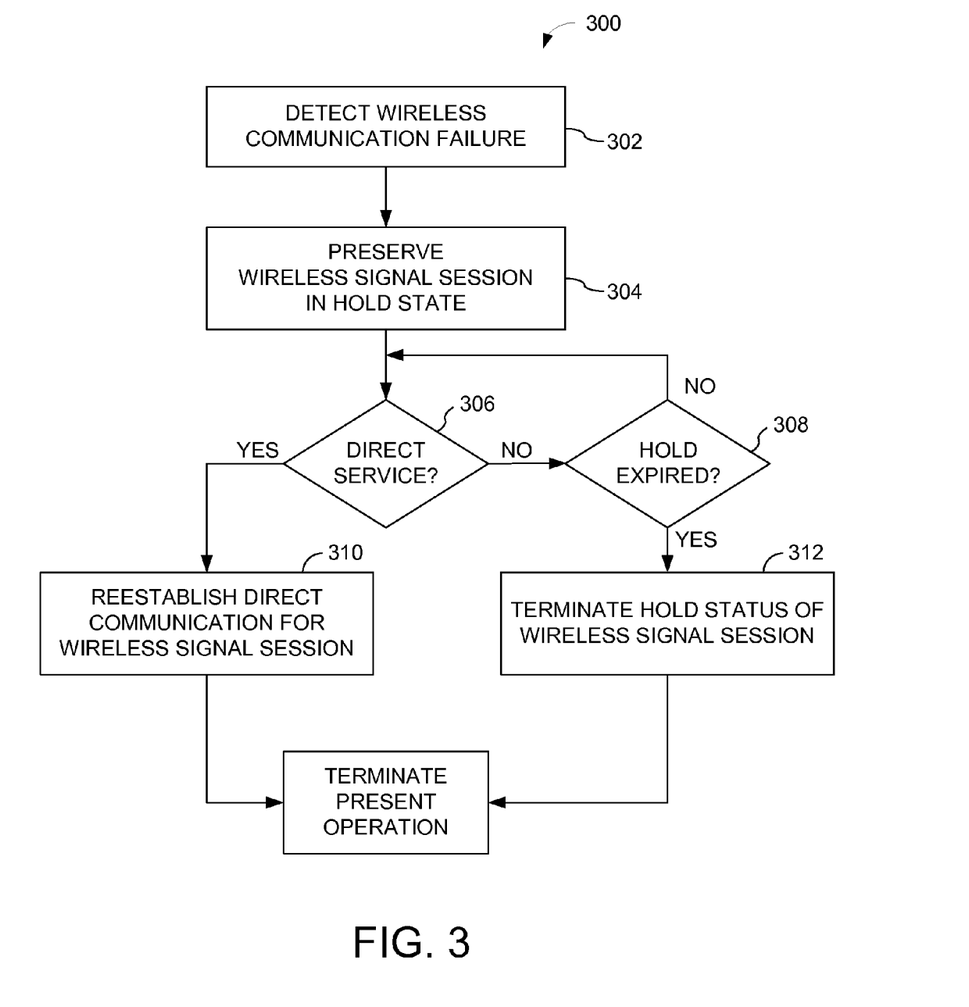
FIG. 3 is a flow diagram depicting a method in accordance with one embodiment.

FIG. 3 is a flow diagram depicting an illustrative method 300 of wireless signal session handling in accordance with one embodiment. The method 300 includes particular method steps and a particular order of execution. However, other embodiments can also be used that deviate in one or more respects from the method 300 without departing from the scope of the present teachings. For purposes of understanding, certain aspects of the method 300 will be described with reference to the operational scenario 100 of FIG. 1.

At 302, a failure in communication during a wireless session is detected. As used herein, "wireless session" refers to a period of time during which a wireless device, such as the wireless device 102, accesses a supporting wireless system, such as the wireless system 124. Such detection can, for example, be performed by any suitable resource(s) of the wireless system 124. Such detection resources can include, for example, loss of signal (LoS) detection, "squelch" functionality, digital encoding/decoding systems, etc. Other appropriate resources can also be used. Communication is defined as unidirectional or bidirectional communication between the wireless device 102 and one or more resources of the wireless system 124 and/or at least one other telecommunications entity. For purposes of non-limiting illustration, it is presumed that the wireless device 102 was communicating with the landline telephone 146 by way of the wireless system 124 just prior to the communication failure. It is further presumed that the communication failure is caused by the wireless device 102 leaving the signal coverage area 114 at point 134.

At 304, the wireless system 124 preserves the wireless session (e.g., telephone call) in a hold condition. The hold condition is temporary in nature and limited to a predefined duration. In one embodiment, the duration can correspond to an estimated rate of propagation of the wireless device 102 between respective coverage areas of the wireless systems 124. In the ongoing illustration, it is presumed that the wireless system 124 has calculated (estimated) that the wireless device 102 will (or can) enter any of the coverage areas 116, 118, 120 within the next sixty seconds. Other schemes can also be used to establish a limited hold period duration. In one or more embodiments, the wireless system 124 issues a notification regarding the hold status to an entity that was, prior to the failure, in communication with the wireless device 102. In this illustration, the notification is issued to the landline telephone 146. The notification can be verbal, visual, a data packet, or some other suitable form. For example, a verbal message can be issued to the effect of: "Your call is on hold. Please wait while we attempt to reestablish communication." Other notifications can also be used.

At 306, the wireless system 124 tests to determine if direct wireless communication can be reestablished with the wireless device 102. Such testing can be made by way of any or all of the cellular service towers 104, 106, 108, 110. In this way, the wireless system 124 makes the fullest, reasonably possible attempt to reestablish wireless communication within the geographic region where the wireless device 102 was last known to be present. If such direct communication can be reestablished, then the method 300 proceeds to 310 below. If such direct communication cannot be reestablish, the method 300 proceeds to 308 below.

At 308, the wireless system 124 determines if the predefined hold period has expired. If the hold period has expired, the method 300 proceeds to 312 below. If the hold period has not yet expired, then the method 300 proceeds back to 306 above.

At 310, the wireless system 124 reestablishes direct communication with the wireless device 102. The wireless signal session then continues—in the case of the ongoing illustration, the wireless device 102 resumes communications with the landline telephone 146. Additionally, the hold period initiated at 304 above is terminated. The method 300 then terminates the present operation.

At 312, the wireless system 124 terminates the hold period initiated at 304 above. In one or more embodiments, a notification is issued in accordance with the termination of the hold status. In the ongoing illustration, such a notification is issued to the landline telephone 146 to the effect of: "The hold period has been terminated. Please reattempt communication at a later time." In any case, the method 300 then terminates the present operation.

The method 300 represents one suitable embodiment of handling a failed wireless signal session by way of a hold status and reestablished communication. A limited hold period is a necessary aspect in order to prevent tying up wireless system resources indefinitely, while allowing some opportunity to continue the wireless signal session without the need to reinitiate wireless access from the beginning (e.g., redialing a cellular phone call, logging in to a wireless Internet service provider, etc.).

While the method 300 was described with reference to the scenario 100 of FIG. 1, it is to be understood that the method 300, and/or suitable variations thereof, can be used in different operational scenarios. For example, the method 300 can be implemented in the context of the scenario 200 of FIG. 2. Thus, a wireless signal session—performed by way of the cellular service tower 204—might be interrupted as result of entering tunnel 218. The wireless system 208 can place the wireless signal session on hold, allotting forty seconds to reestablish communications by way of the cellular service tower 206. Assuming the corresponding wireless device 102 emerges from the tunnel 218 within the predefined hold period, the wireless signal session is removed from hold status and communication is reestablished via tower 206.

The method 300 of FIG. 3 is illustrative of numerous wireless signal session handling schemes in accordance with the present teachings. Other methods including some or all of the steps 302-312 described above, or other steps, and/or other sequences of execution can also be used and are within the scope of the present teachings. The method 300 can be implemented by way of any suitable construct such as, for example, one or more processors under software (program code) control, dedicated-purpose apparatus, etc.

Figure 4:
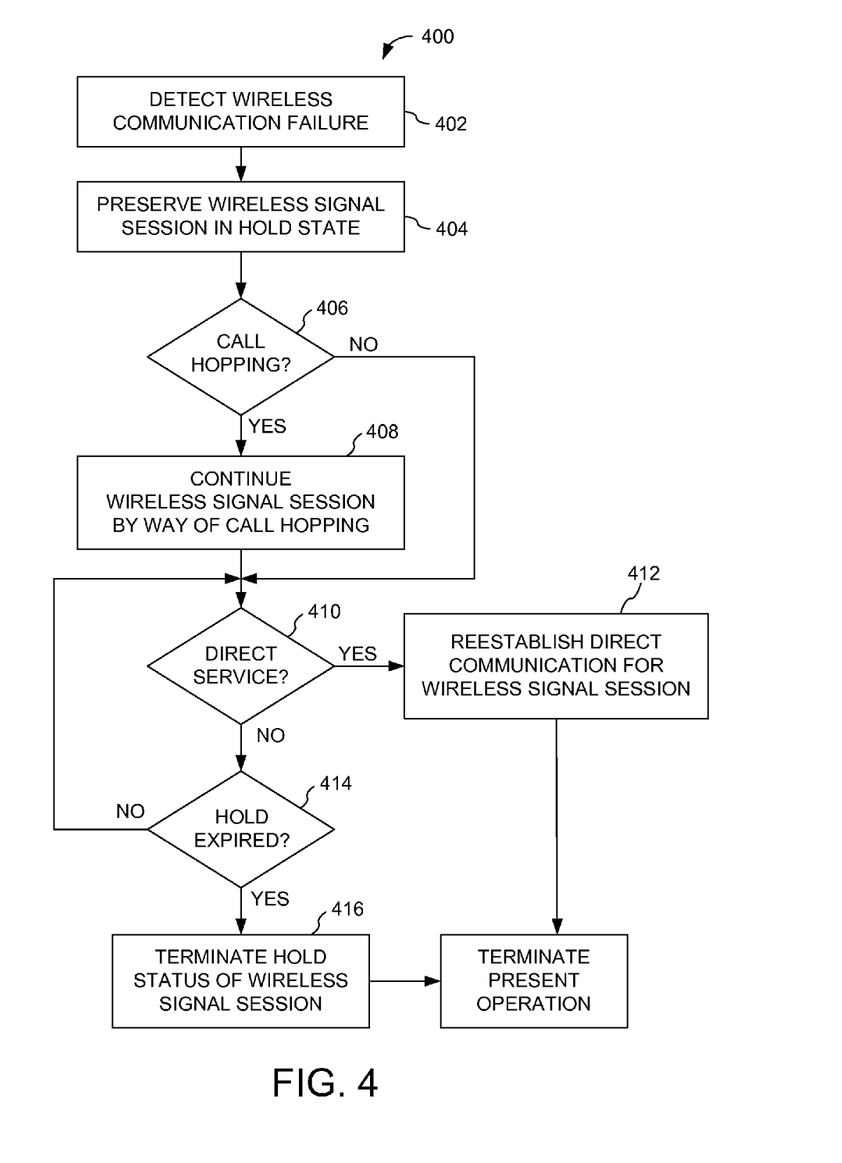
FIG. 4 is a flow diagram depicting a method in accordance with another embodiment.

FIG. 4 is a flow diagram depicting an illustrative method 400 of wireless signal session handling in accordance with another embodiment. The method 400 includes particular method steps and a particular order of execution. However, other embodiments can also be used that deviate in one or more respects from the method 400 without departing from the scope of the present teachings. For purposes of illustration, the method 400 will be described with reference to another operational scenario 500 depicted by FIG. 5.

Figure 5:
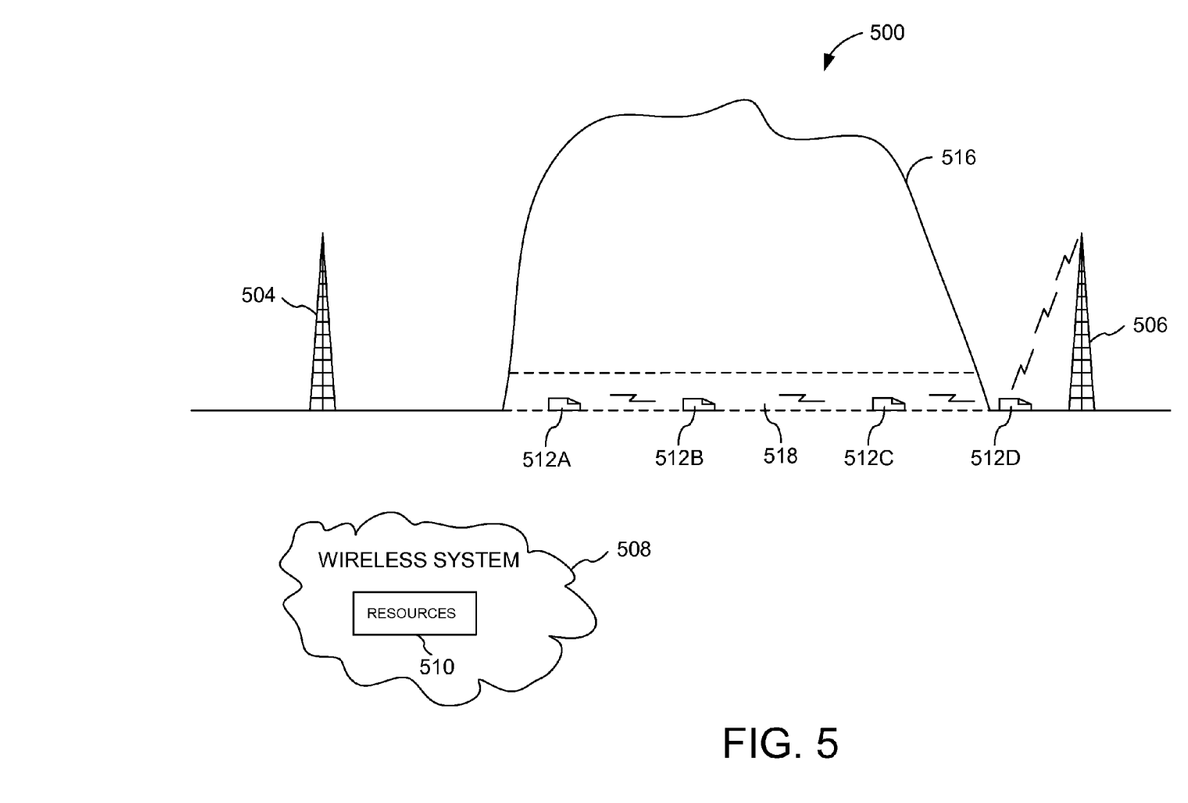
FIG. 5 is an elevation diagrammatic view depicting another illustrative operating scenario.

At 402, a failure in communication during a wireless session is detected. Such detection can be performed, for example, by any suitable resource(s) 510 of a wireless system 508. For purposes of non-limiting illustration, it is presumed that a wireless device (not shown) within an automobile 512A was communicating with another telecommunication device by way of the wireless system 508 just prior to the communication failure. It is further presumed that the communication failure is caused by the automobile 512A entering a tunnel 518 through a mountain 516, thus leaving the wireless signal coverage area of a cellular service tower 504.

At 404, the wireless system 508 preserves the wireless session (e.g., cellular call, etc.) in a hold condition or state. The hold condition is temporary in nature and limited to a predefined duration. In one embodiment, the duration can correspond to an estimated rate of propagation of the wireless device (i.e., the automobile 512A) between respective coverage areas of the wireless systems 508. In the ongoing illustration, it is presumed that the wireless system 508 has estimated that emergence of the automobile 512A from the tunnel 518 within the next thirty-five seconds. Other schemes can also be used to establish a limited hold period duration. In one or more embodiments, the wireless system 508 issues a notification regarding the hold status.

At 406, the wireless system 508 determines if other wireless devices are within wireless signal range of the automobile 512A and the wireless device (not shown) therein. Such a determination can be performed, for example, by examination of other present wireless signal sessions in progress by way of the wireless system 508. In one embodiment, a general query is transmitted from the cellular service tower 506 to determine if other wireless devices in the area can be used to perpetuate the wireless signal session of the automobile 512A. If such wireless device(s) is/are present, then the method 400 proceeds to 408 below. If there are no such other wireless signal devices, then the method proceeds to 410 below.

At 408, the wireless system 508 continues the wireless signal session of the device of automobile 512A by way of signal propagation or "call hopping" between other wireless devices (not shown) within automobiles 512B, 512C and 512D. The automobile 512D is within direct wireless signal range of the cellular service tower 506. Thus, the wireless devices within automobiles 512B-512D act as "repeaters" to complete a wireless signal daisy chain between the automobile 512A and the cellular service tower 506 (as well as the wireless system 508 coupled thereto). It is noted that wireless devices within at least automobiles 512B and 512C, which participate in the call hopping procedure, are not within direct wireless communication of the cellular service tower 506.

At 410, the wireless system 508 tests to determine if direct wireless communication can be reestablished with the wireless device within the automobile 512A. If such direct communication can be reestablished, then the method 400 proceeds to 412 below. If such direct communication cannot be reestablished, the method 400 proceeds to 414 below.

At 412, the wireless system 508 reestablishes direct communication with the wireless device within the automobile 512A. The wireless signal session then continues substantially as before the communication failure was detected at 402 above. Additionally, the hold period initiated at 404 above is terminated. The method 500 then terminates the present operation.

At 414, the wireless system 508 determines if the predefined hold period has expired. If the hold period has expired, the method 400 proceeds to 416 below. If the hold period has not yet expired, then the method 400 proceeds back to 410 above.

At 416, the wireless system 508 terminates the hold period initiated at 404 above. In one or more embodiments, a notification is issued in accordance with the termination of the hold status. The method 400 then terminates the present operation. The methods 300 and 400, and any respective variations thereon, can be implemented in any number of suitable ways. Non-limiting examples of such implementations can include one or more processors under software (e.g., computer-readable storage media 130) control, one or more dedicated purpose apparatus, suitably configured resources within a wireless system (e.g., 124, 208, 508), etc.

CONCLUSION

Although the disclosure has been made in language specific to structural features and/or methodological acts, it is to be understood that the disclosed concepts are not necessarily limited to the specific features or acts described. Rather, the specific features and acts are disclosed as exemplary implementations.

What is claimed is:

1. A method comprising:
    detecting a communication failure associated with direct communication between a first wireless device and a wireless system during a wireless signal session;
    preserving the wireless signal session in a temporary hold state at the wireless system;
    establishing indirect communication between the first wireless device and the wireless system via a second wireless device to continue the wireless signal session while the direct communication between the first wireless device and the wireless system is being reestablished, the second wireless device being a mobile device; and
    reestablishing the direct communication between the first wireless device and the wireless system to continue the wireless signal session, wherein reestablishing the direct communication between the first wireless device and the wireless system is performed based on
    an estimated rate of propagation of the first wireless device between two or more respective wireless signal coverage areas of the wireless system.

2. The method of claim 1 wherein the wireless signal session comprises communication between the first wireless device and a telecommunications device by way of the wireless system.

3. The method of claim 1, further comprising issuing a notification from the wireless system corresponding to the hold state of the wireless signal session.

4. The method of claim 1 wherein:
    the communication failure corresponds to a first resource of the wireless system; and
    reestablishing the direct communication between the first wireless device and the wireless system is performed by way of a second resource of the wireless system.

5. The method of claim 4 wherein the first resource and the second resource are respective cellular communications towers of the wireless system.

6. The method of claim 1 further comprising:
    establishing the indirect communication between the first wireless device and the wireless system via the second wireless device and a third wireless device to continue the wireless signal session while the direct communication between the first wireless device and the wireless system is being reestablished.

7. The method of claim 6 wherein at least one of the second or third wireless devices is not in direct communication with the wireless system.

8. The method of claim 1, further comprising terminating the indirect communication in response to reestablishing the direct communication.

9. At least one tangible computer-readable storage media storing machine readable instructions which, when executed, cause one or more processors to at least:
    detect a communication failure associated with direct communication between a first wireless device and a wireless system during a wireless signal session;
    preserve the wireless signal session in a temporary hold state;
    establish indirect communication between the first wireless device and the wireless system via a second wireless device to continue the wireless signal session while the direct communication between the first wireless device and the wireless system is being reestablished, the second wireless device being a mobile device; and
    reestablish the direct communication between the wireless device and the wireless system to continue the wireless signal session, wherein the machine readable instructions, when executed, cause the one or more processors to reestablish the direct communication between the first wireless device and the wireless system based on an estimated rate of propagation of the first wireless device between two or more respective wireless signal coverage areas.

10. The at least one computer-readable storage media of claim 9 wherein the wireless signal session comprises communication between the first wireless device and a telecommunications device.

11. The at least one computer-readable storage media of claim 9 wherein the machine readable instructions, when executed, cause the one or more processors to issue a notification corresponding to the hold state of the wireless signal session.

12. The at least one computer-readable storage media of claim 9 wherein the communication failure corresponds to a first resource, and the machine readable instructions, when executed, cause the one or more processors to:
    reestablish the direct communication between the first wireless device and the wireless system by way of a second resource.

13. The at least one computer-readable storage media of claim 12 wherein the first resource and the second resource are respective cellular communications towers.

14. The at least one computer-readable storage media of claim 9 wherein the machine readable instructions, when executed, cause the one or more processors to:
    establish the indirect communication between the first wireless device and the wireless system via the second wireless device and a third wireless device to continue the wireless signal session while the direct communication between the first wireless device and the wireless system is being reestablished.

15. The at least one computer-readable storage media of claim 14 wherein at least one of the second or third wireless devices is not in direct communication with the one or more processors.

16. The at least one computer-readable storage media of claim 9 wherein the machine readable instructions, when executed, cause the one or more processors to terminate the indirect communication in response to reestablishing the direct communication.

17. At least one tangible computer-readable storage media storing machine readable instructions which, when executed, cause one or more processors of a wireless system to at least:

detect a failure in communication between a wireless device and a telecommunications device during a wireless signal session, the wireless signal session performed by way of the wireless system;

preserve the wireless signal session in a hold state of limited duration;

issue a notification to the telecommunications device corresponding to the hold state;

reestablish communication between the wireless device and the telecommunications device based on an estimated rate of propagation of the wireless device between two or more respective wireless signal coverage areas provided that the limited duration of the hold state has not expired; and terminate the hold state and the wireless signal session if the limited duration of the hold state has expired.

18. The at least one computer-readable storage media of claim 17 wherein the machine readable instructions, when executed, cause the one or more processors of the wireless system to:

establish temporary communication between the wireless device and the telecommunications device by way of one or more other wireless devices.

* * * * *